United States Patent
Li et al.

(10) Patent No.: US 8,789,685 B2
(45) Date of Patent: Jul. 29, 2014

(54) CONVEYING DEVICE

(71) Applicants: Hong Fu Jin Precision Industry (ShenZhen) Co., Ltd., Shenzhen (CN); Hon Hai Precision Industry Co., Ltd., New Taipei (TW)

(72) Inventors: Bing Li, Shenzhen (CN); Bo Yang, Shenzhen (CN); Yong Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/687,434

(22) Filed: Nov. 28, 2012

(65) Prior Publication Data

US 2013/0270071 A1  Oct. 17, 2013

(30) Foreign Application Priority Data

Apr. 16, 2012 (CN) .......................... 2012 1 0109833

(51) Int. Cl.
*B65G 35/06* (2006.01)
(52) U.S. Cl.
CPC ...... *B65G 35/063* (2013.01); *B65G 2201/0267* (2013.01)
USPC ................... 198/786; 198/465.1; 198/867.13; 198/345.3
(58) Field of Classification Search
USPC ................ 198/465.1, 465.4, 786, 468.9, 722, 198/867.13, 345.3; 104/166
See application file for complete search history.

(56) References Cited

U.S. PATENT DOCUMENTS

| | | | | |
|---|---|---|---|---|
| 2,241,399 A * | 5/1941 | Harris | ....................... | 198/867.13 |
| 4,338,864 A * | 7/1982 | Ziegenfus | ..................... | 104/121 |
| 4,378,741 A * | 4/1983 | Nagahori | ......................... | 104/18 |
| 4,428,300 A * | 1/1984 | Ziegenfus et al. | ............ | 104/250 |
| 4,612,861 A * | 9/1986 | Lindquist | ....................... | 104/166 |
| 4,619,204 A * | 10/1986 | Lindquist | ....................... | 104/166 |
| 4,782,760 A * | 11/1988 | Rohrbach et al. | ............ | 104/166 |
| 5,785,168 A * | 7/1998 | Beall, Jr. | ..................... | 198/465.4 |
| 5,806,655 A * | 9/1998 | Tabler | ......................... | 198/465.3 |
| 6,032,785 A * | 3/2000 | Beall, Jr. | ..................... | 198/465.4 |
| 7,337,894 B2 * | 3/2008 | Tabler | ......................... | 198/465.4 |

FOREIGN PATENT DOCUMENTS

| | | |
|---|---|---|
| EP | 1707509 A1 | 4/2006 |
| JP | 64-13315 A | 1/1989 |
| JP | 2-215605 A | 8/1990 |

* cited by examiner

*Primary Examiner* — Mark A Deuble
(74) *Attorney, Agent, or Firm* — Novak Druce Connolly Bove + Quigg LLP

(57) ABSTRACT

A conveying device includes a supporting platform, a rolling member, a driving member, and a conveying assembly. The rolling member rotatably is mounted on the supporting platform. The driving member is connected to the rolling member, for driving the rolling member to rotate along an axis. The conveying assembly includes a supporting member, a fixing member, and several rollers. The fixing member is mounted on a side of the supporting member towards the supporting platform, and defines an arcuate mounting surface. The rollers are mounted on the arcuate mounting surface, and resist the rolling member. Sets of two rollers are located on opposite sides of the rolling member. The rotation axes of the rollers are inclined relative to the rotation axis of the rolling member, which enable the rotation of the rolling member to drive the rollers to rotate and slide along the rolling member.

18 Claims, 3 Drawing Sheets

CONVEYING DEVICE

BACKGROUND

1. Technical Field

The present disclosure relates to conveying devices, particularly to a conveying device configured to automatically convey workpieces.

2. Description of Related Art

Conveying devices are used to carry and convey workpieces, automatically. A conveying device may be a chain-linked conveyor or a belt conveyor. The chain-linked conveyor includes many chains and many gears meshing with the chains, which may be very noisy when being used. Higher conveying speeds of both the chain-linked conveyor and the belt conveyor result in louder noises being produced. The noise pollution caused by the noisy operation of the conveying devices leads to unhealthy working conditions for the workers.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
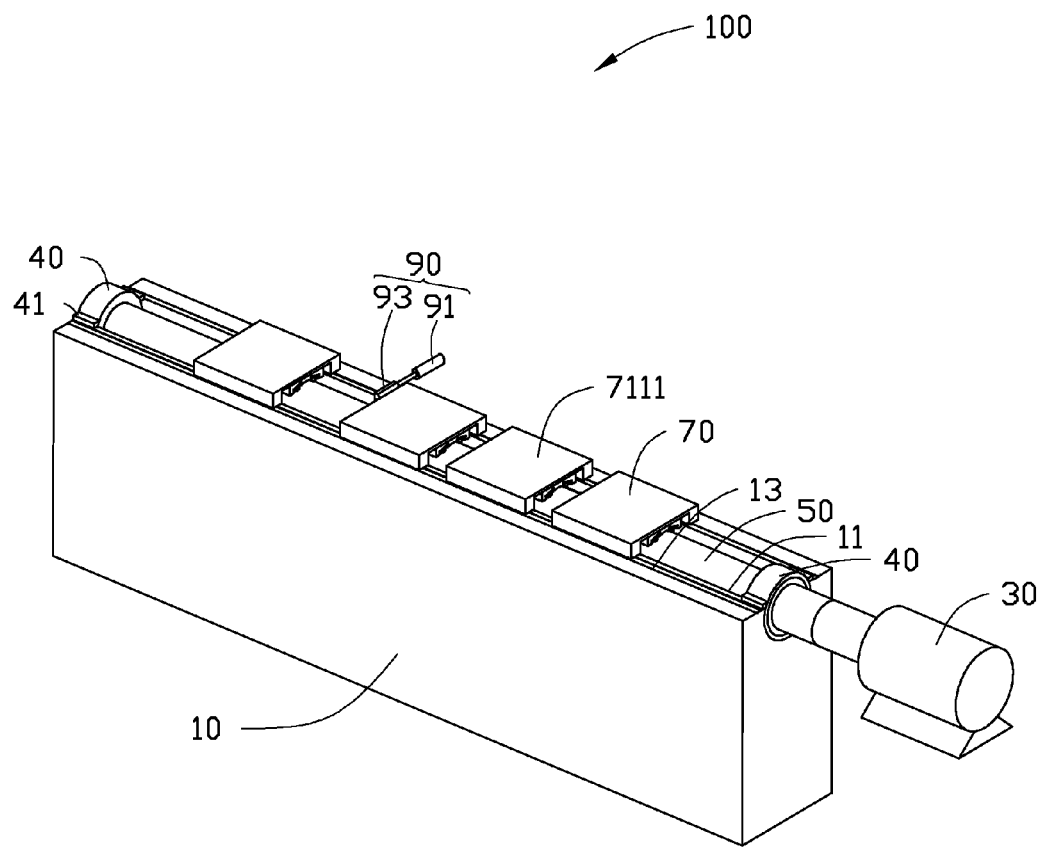
FIG. 1 is an assembled, isometric view of an embodiment of a conveying device.

FIG. 1 shows an embodiment of a conveying device 100. The conveying device 100 includes a supporting platform 10, a first driving member 30, at least one mounting member 40, a rolling member 50, at least one conveying assembly 70, and a positioning assembly 90. The first driving member 30 is positioned on an end of the supporting platform 10. The mounting member 40 is mounted on a top surface of the supporting platform 10, for supporting the rolling member 50. The rolling member 50 is movably mounted on the top surface of the supporting platform 10 via the mounting member 40. An end of the rolling member 50 is connected to the first driving member 30. The first driving member 30 drives the rolling member 50 to rotate around an axis of the rolling member 50. In the illustrated embodiment, a quantity of the at least one conveying assemblies 70 is four. The conveying assemblies 70 are detachably and slidably positioned on the top surface of the supporting platform 10 along a direction of the axis of the rolling member 50, and are arranged apart from each other. When the rolling member 50 rotates, the conveying assemblies 70 slides on the top surface of the supporting platform 10 along a direction of the axis of the rolling member 50. The conveying assemblies 70 are configured to support and convey workpieces (not shown). The positioning assembly 90 is positioned on a side of the supporting platform 10, for positioning the conveying assemblies 70 and the workpieces.

The supporting platform 10 is substantially a bar-typed platform, and defines a receiving groove 11 and a pair of sliding grooves 13 at the top surface along a longitudinal (lengthwise) direction of the supporting platform 10. The pair of sliding grooves 13 is positioned at opposite sides of the receiving groove 11. The sliding grooves 13 are bar-shaped, for providing a sliding track for the conveying assemblies 70.

In the illustrated embodiment, there are two mounting members 40 respectively mounted on opposite ends of the supporting platform 10. The mounting members 40 are substantially hollow cylinders. A pair of fixing portions 41 protrudes from two opposite sides of each mounting member 40. The fixing portions 41 are fixed on the top surface of the supporting platform 10, such that the mounting members 40 are partially received in the receiving groove 11.

The rolling member 50 is substantially cylindrical, and is movably inserted into the mounting members 40. A distal end of the rolling member 50 is connected to the first driving member 30. The first driving member 30 drives the rolling member 50 to rotate around a rotation axis A of the rolling member 50 (shown in FIG. 3). In the illustrated embodiment, the first driving member 30 is a motor. In other embodiments, the first driving member 30 may be other drivers, such as an air cylinder, for example.

Figure 2:
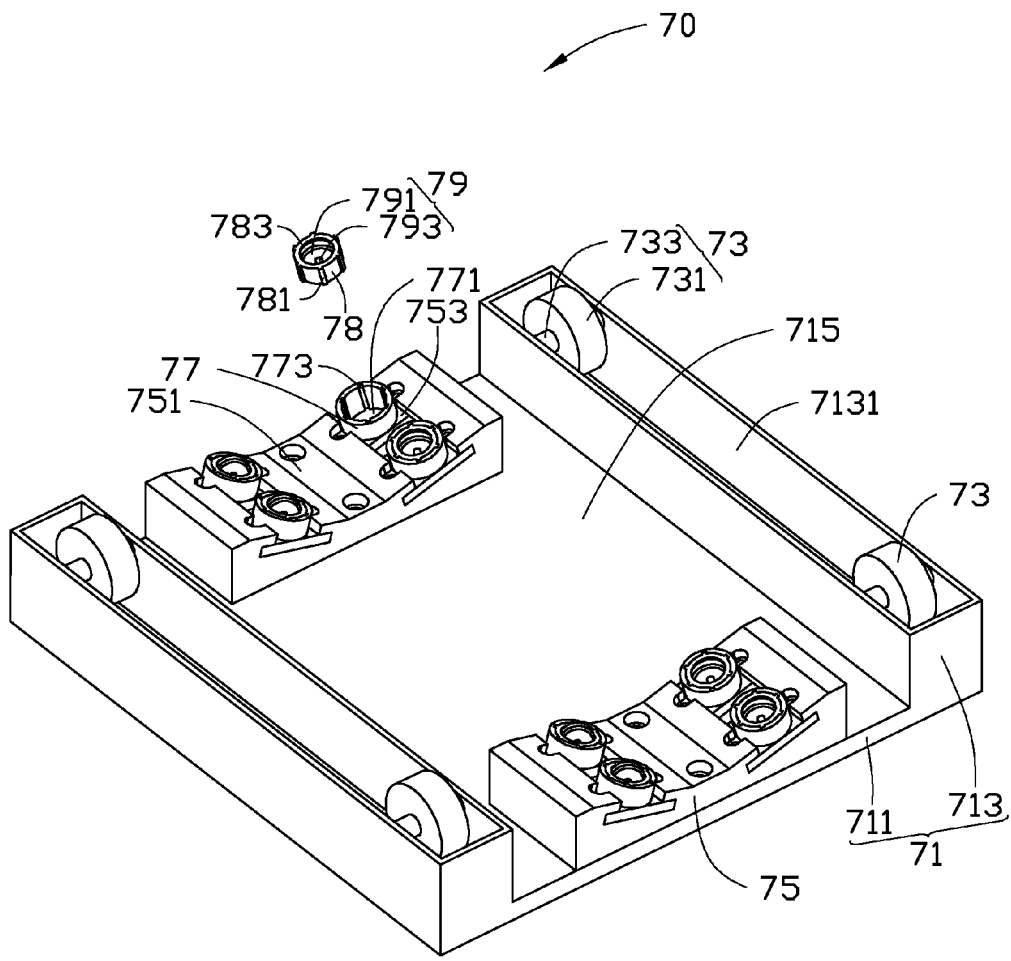
FIG. 2 is a partial, exploded, isometric view of the conveying device shown in FIG. 1.

FIG. 2 shows a conveying assembly 70 including a supporting member 71, four sliding members 73, two fixing members 75, eight latching members 77, eight locking members 78, and eight rollers 79. The supporting member 71 is configured for supporting workpieces. The four sliding members 73 are mounted on four corners of the supporting member 71, accordingly, and are received in the sliding grooves 13. The sliding members 73 are slidable along the sliding grooves 13 which are parallel with each other, in such a way that allows the supporting member 71 to be slidable along the sliding grooves 13. The fixing members 75 are mounted on the supporting member 71, and are configured to fix the latching members 77, the locking members 78, and the rollers 79. Four of the eight latching members 77 are fixed on one corresponding fixing member 75. Each locking member 78 is latched with one corresponding latching member 77. Each roller 79 is rotatably mounted on one corresponding locking member 78, and contacts with the rolling member 50. The rolling member 50 rotates to drive the rollers 79 to rotate along the rolling member 50, which results in the conveying assembly 70 sliding along the supporting platform 10.

The supporting member 71 includes a main body 711 and a pair of extending portions 713 perpendicularly extending from opposite ends of the main body 711 towards the supporting platform 10. The main body 711 and the extending portions 713 cooperatively define a receiving chamber 715, for receiving the fixing members 75, the latching members 77, the locking members 78, and the rollers 79. The main body 711 is substantially a rectangular plate, and includes a supporting surface 7111 (shown in FIG. 1) located at a side away from the extending portions 713. The supporting surface 7111 is configured to support workpieces. Each extending portion 713 defines a containing groove 7131 at a distal end thereof away from the main body 711, for receiving the sliding members 73. Each two of the four sliding members 73 are fixed within one corresponding containing groove 7131. Each sliding member 73 includes a rotating portion 731 and a fixing rod 733. The fixing rod 733 rotatably passes through a middle portion of the rotating portion 731. Opposite ends of the fixing rod 733 are fixed with opposite inner sidewalls of the containing groove 7131. The rotating portions 731 of the four sliding members 73 are partially received in the sliding grooves 13, which enable the conveying assembly 70 to slide along the sliding grooves 13.

The fixing members 75 are fixed on a surface of the main body 711 opposite to the supporting surface 7111, and are arranged at substantially two opposite ends of the main body 711. The fixing members 75 are received in the receiving chamber 715. Each fixing member 75 includes a mounting surface 751 adjacent to the supporting platform 10 corresponding to an outer sidewall of the rolling member 50. The mounting surface 751 is substantially arcuate. The mounting surface 751 defines a pair of fixing grooves 753 arranged apart, and parallel to each other. The fixing grooves 753 are parallel to the containing grooves 7131, for mounting the latching members 77.

Each four of the eight latching members 77 are mounted on one corresponding mounting surface 751, and each two latching members 77 are mounted on one corresponding fixing groove 753 of one corresponding fixing member 75, and are arranged apart along the fixing groove 753. Each latching member 77 defines a receiving hole 771 along an axis thereof, and is a substantially hollow cylinder. An inner sidewall of the receiving hole 771 defines a plurality of latching grooves 773 evenly spaced from each other, and are parallel to the axis of the latching member 77, for locking the locking member 78. In the illustrated embodiment, there are six latching grooves 773 for each latching member 77.

Each locking member 78 is inserted into the receiving hole 771, and is substantially cylindrical, for matching with the shape of the receiving hole 771. Six latching portions 781 are evenly spaced and protruding from an outer sidewall of the locking member 78 corresponding to the latching grooves 773. The locking member 78 defines a containing chamber 783 along an axis, for containing one corresponding roller 79. The locking member 78 is inserted into the receiving hole 771, and the latching portions 781 are latched with the latching grooves 773, so that each locking member 78 is assembled with one corresponding latching member 77. In other embodiments, the number of the latching grooves 773 can be two, three, four, or more, and the number of the latching portions 781 is equal to the number of the latching grooves 773. The latching grooves 773 can be defined on the locking member 78, and the latching portions 781 can protrude from the latching member 77 in one of the other embodiments.

Each of the eight rollers 79 is inserted into one corresponding containing chamber 783. Each of the eight rollers 79 includes a rolling portion 791 and a fixing shaft 793. The fixing shaft 793 passes through a middle portion of the rolling portion 791, and opposite ends of the fixing shaft 793 are fixed with an inner sidewall of the containing chamber 783 with an included angle formed relative to the extending portions 713, thereby the rolling portion 791 is assembled with the locking member 78. A rotation axis of the rolling portion 791 is defined as a rotation axis B (shown in FIG. 3), and the rotation axis B inclines relative to the extending portions 713 in an abuse angle or in an acute angle. When the conveying assembly 70 is mounted on the supporting platform 10, the rolling portion 791 resists against the rolling member 50, and the rotation axis B of the roller 79 inclines relative to the rotation axis A of the rolling member 50 with an included angle defined as θ (shown in FIG. 3). The rollers 79 can be adjusted to other included angles relative to the extending portions 713 via having the latching portions 781 latched with the latching grooves 773 in other assembling orders. Therefore, the included angle θ of the rotation axis B relative to the rotation axis A can be adjusted by adjusting an assembling order of the locking members 78 with the latching members 77.

The positioning assembly 90 (shown in FIG. 1) includes a second driving member 91 and a positioning block 93. The second driving member 91 is located on a fixing platform (not shown) besides the supporting platform 10. The positioning block 93 is mounted on an end of the second driving member 91 towards the supporting platform 10. The second driving member 91 drives the positioning block 93 to move to the top surface of the supporting platform 10, the conveying assembly 70 is then stopped. Therefore, the workpieces on the supporting surface 7111 are positioned. In the illustrated embodiment, the second driving member 91 is a cylinder.

In assembly, the rolling member 50 is mounted on the supporting platform 10 via the mounting members 40, and the rolling member 50 is received in the receiving groove 11. The first driving member 30 is mounted on a distal end of the rolling member 50. The second driving member 91 is positioned on the fixing platform located besides the supporting platform 10, and the positioning block 93 is positioned at a side of the second driving member 91 towards the supporting platform 10. The four conveying assemblies 70 are put on the top surface of the supporting platform 10 one by one. The sliding members 73 are received in the sliding grooves 13, and the rollers 79 resist on a cylindrical outer sidewall of the rolling member 50.

Figure 3:
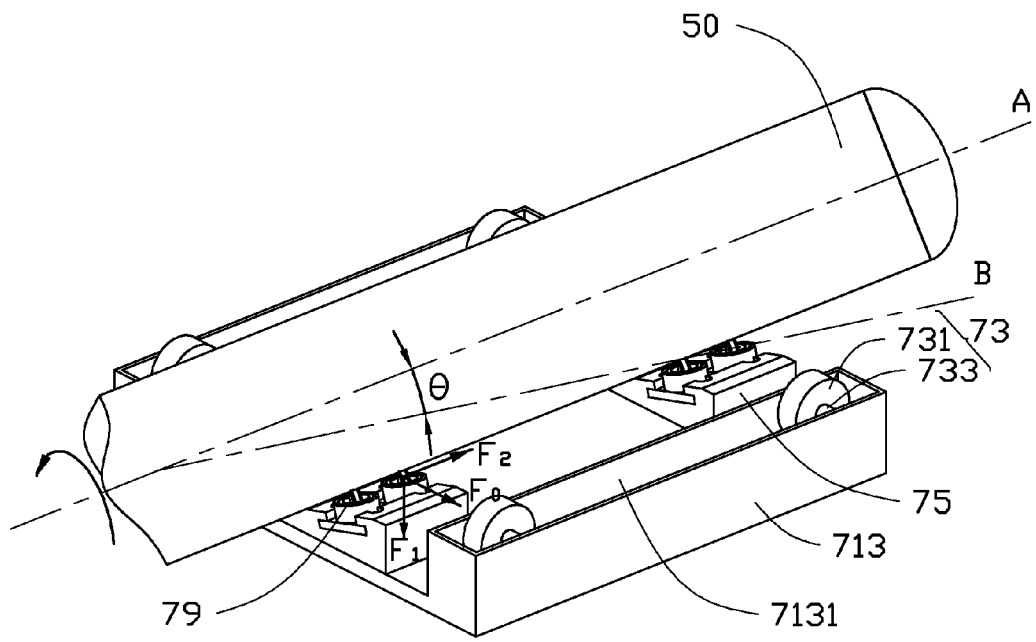
FIG. 3 is a partial, isometric view of the conveying device shown in FIG. 1 in a working state.

In use, a plurality of workpieces are put on the supporting surface 7111. The first driving member 30 drives the rolling member 50 to rotate. The rotation of the rolling members 50 applies a force defined as $F_0$ to the rolling portion 791. A direction of the force $F_0$ overlaps with a tangent line of the rolling member 50. The resolution of the force $F_0$ is shown in FIG. 3. The force $F_0$ is resolved into a split force $F_1$ along a tangent line of the rolling member 50 and a split force $F_2$ parallel to the axis A of the rolling member 50. The rolling portion 791 is driven by the split force $F_1$ to rotate relative to the fixing shaft 793. The split force $F_2$ drives the rollers 79 to slide along the rolling member 50, thus the sliding members 73 slide along the sliding grooves 13, and the supporting member 71 moves relative to the supporting platform 10. Therefore, the workpieces are conveyed by the conveying assemblies 70. When the workpieces are needed to be positioned, the second driving member 91 drives the positioning block 93 to protrude out of the top surface of the supporting platform 10, so that the conveying assembly 70 and the workpieces are positioned by the positioning block 93.

Because the rotation of the rolling member 50 drives the rollers 79 to slide along the rolling member 50, it makes lesser noise when conveying workpieces, and the conveying assembly 70 slides more easily along the rolling member 50. In addition, the positioning assembly 90 can easily position the workpieces during the conveying process.

In other embodiments, the latching members 77 or the rollers 79 can be directly mounted on a bottom surface of the supporting member 71, or the rollers 79 may be directly mounted on the mounting surface 751, but the rotation axis of the rolling member 50 needs to be inclined relative to the rotation axis of the roller 79 in an abuse angle or in an acute angle. The number of the rollers 79 may be one, two, three, four, or more than four, the number of the latching members 77 and the number of the locking members 78 may be one, two, three, four, or more than four corresponding to the number of the rollers 79.

It is believed that the present embodiments and their advantages will be understood from the foregoing description, and it will be apparent that various changes may be made thereto without departing from the spirit and scope of the embodiments or sacrificing all of its material advantages.

What is claimed is:
1. A conveying device, comprising:
a supporting platform;
a rolling member rotatably mounted on the supporting platform;

a first driving member connected to the rolling member, the first driving member for driving the rolling member to rotate around an axis of the rolling member; and at least one conveying assembly slidably mounted on the supporting platform, the at least one conveying assembly comprising a supporting member, at least two sliding members mounted on the supporting member, and at least one roller rotatably mounted on a side of the supporting member towards the supporting platform, and the at least one roller resisting against the rolling member, the supporting platform defining a receiving groove and a pair of sliding grooves parallel to each other, the rolling member partially received in the receiving groove, the at least two sliding members are received in the corresponding sliding grooves, the at least two sliding members slides along the sliding grooves, wherein a rotation axis of the roller is inclined relative to a rotation axis of the rolling member, so that the rotation of the rolling member thereby driving the roller rotating and sliding along the rolling member.

2. The conveying device of claim 1, wherein the at least one conveying assembly further comprises at least one latching members and at least one locking member, the at least one latching member is fixed on the side of the supporting member towards the supporting platform, the at least one latching member defines a receiving hole, an inner sidewall of the receiving hole defines at least one latching groove, at least one latching portion corresponding to at least one latching groove protruded from an outer sidewall of the at least one locking member, the at least one latching portion latches with the at least one latching groove, the at least one roller is rotatably mounted on the at least one locking member, an included angle is defined between the rotation axis of the at least one roller relative to the rotation axis of the rolling member.

3. The conveying device of claim 2, wherein there are at least three latching grooves evenly spaced at the inner sidewall of the latching member, and at least three latching portions evenly spaced on the outer sidewall of the at least one locking member, the included angle is capable of being adjusted via changing an assembling order of the at least three latching portions with the at least three latching grooves.

4. The conveying device of claim 3, wherein a number of the latching groove is equal to a number of the latching portion.

5. The conveying device of claim 3, wherein the at least one locking member defines a containing chamber, the at least one roller includes a rolling portion and a fixing shaft passing through the rolling portion, two ends of the fixing shaft are fixed with an inner sidewall of the containing chamber.

6. The conveying device of claim 2, wherein the conveying assembly further comprises at least one fixing member, and the at least one latching member is fixed on the supporting member via the at least one fixing member, the fixing member comprises an arcuate mounting surface corresponding to an outer sidewall of the rolling member, the arcuate mounting surface defines at least one fixing groove, the at least one latching member is fixed within the at least one fixing groove.

7. The conveying device of claim 1, wherein the conveying device further comprises at least one mounting member, a pair of fixing portions protrude from an outer sidewall of the at least one mounting member, the fixing portions are fixed with the supporting platform, the rolling member rotatably passes through the at least one mounting member.

8. The conveying device of claim 1, wherein the supporting member comprises a main body and a pair of extending portions perpendicular protrude from opposite ends of the main body, each extending portion defines a containing groove at an end thereof away from the main body, each sliding member comprises a rotating portion and a fixing rod rotatably passing through the rotating portion, two ends of the fixing rod are fixed on an inner sidewall of the containing groove, the rotating portion is received in the corresponding sliding groove.

9. The conveying device of claim 1, wherein the conveying device further comprises a positioning assembly, the positioning assembly comprises a second driving member and a positioning block mounted on the second driving member, the second driving member is located besides the supporting platform, and drives the positioning block to extend to the supporting platform, for stopping the moving of the at least one conveying assembly.

10. A conveying device, comprising:
a supporting platform;
a rolling member rotatably mounted on the supporting platform;
a first driving member connected to the rolling member, the first driving member for driving the rolling member to rotate around an axis of the rolling member; and
at least one conveying assembly slidably mounted on the supporting platform, and comprising a supporting member, at least two sliding members mounted on the supporting member, at least one fixing member, and at least two rollers, the at least one fixing member mounted on a side of the supporting member towards the supporting platform, and comprising an arcuate mounting surface corresponding to an outer sidewall of the rolling member, the at least two rollers mounted on the arcuate mounting surface, and resisting the rolling member, the at least two rollers located at opposite sides of the rolling member, the supporting platform defining a pair of sliding grooves and a receiving groove parallel to each other, the at least two sliding members received on the corresponding sliding grooves, the receiving groove located between the pair of sliding grooves, the rolling member partially received in the receiving groove,
wherein the rotation axes of the rollers are inclined relative to the rotation axis of the rolling member, such that the rotation of the rolling member thereby driving the rollers to rotate and slide along the rolling member.

11. The conveying device of claim 10, wherein the at least one conveying assembly further comprises at least two latching members and at least two locking members, the at least two latching members are fixed on the arcuate mounting surface, each of the at least two latching members defines a receiving hole, an inner sidewall of the receiving hole defines at least one latching groove, at least one latching portion corresponding to at least one latching groove protruded from an outer sidewall of each of the at least two locking members, the at least one latching portion latches with the corresponding at least one latching groove, the at least two rollers are rotatably mounted on the at least two locking members, an included angle is defined between the rotation axis of each of the at least two rollers relative to the rotation axis of the rolling member.

12. The conveying device of claim 11, wherein there are at least three latching grooves evenly spaced at the inner sidewall of each of the at least two latching members, and at least three latching portions evenly spaced on the outer sidewall of each of the at least two locking members, the included angle is capable of being adjusted via changing an assembling order of the at least three latching portions with the at least three latching grooves.

13. The conveying device of claim 12, wherein a number of the latching groove is equal to a number of the latching portion.

14. The conveying device of claim 12, wherein each of the at least two locking members defines a containing chamber, each of the at least two rollers includes a rolling portion and a fixing shaft passing through the rolling portion, two ends of the fixing shaft are fixed with an inner sidewall of the corresponding containing chamber.

15. The conveying device of claim 11, wherein the arcuate mounting surface defines at least two fixing grooves, the at least two latching members are fixed within the corresponding fixing grooves.

16. The conveying device of claim 10, wherein the conveying device further comprises at least one mounting member, a pair of fixing portions protrude from an outer sidewall of the at least one mounting member, the fixing portions are fixed with the supporting platform, the rolling member rotatably passes through the at least one mounting member.

17. The conveying device of claim 10, wherein the supporting member comprises a main body and a pair of extending portions perpendicular protrude from two opposite ends of the main body, each extending portion defines a containing groove at an end thereof away from the main body, each of the sliding members comprises a rotating portion and a fixing rod rotatably passing through the rotating portion, two ends of the fixing rod are fixed on an inner sidewall of the containing groove, the rotating portion is received in the corresponding sliding grooves.

18. The conveying device of claim 10, wherein the conveying device further comprises a positioning assembly, the positioning assembly comprises a second driving member and a positioning block mounted on the second driving member, the second driving member is located besides the supporting platform, and drives the positioning block to extend to the supporting platform, for stopping the moving of the at least one conveying assembly.

\* \* \* \* \*